United States Patent
Zhou

(10) Patent No.: US 7,839,920 B2
(45) Date of Patent: Nov. 23, 2010

(54) METHOD AND SYSTEM FOR ADJUSTING DIGITAL SUBSCRIBER LINE TRANSMITTING POWER LEVEL

(75) Inventor: Jun Zhou, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 710 days.

(21) Appl. No.: 11/882,650

(22) Filed: Aug. 3, 2007

(65) Prior Publication Data

US 2008/0043928 A1 Feb. 21, 2008

Related U.S. Application Data

(63) Continuation of application No. PCT/CN2006/000195, filed on Feb. 5, 2006.

(30) Foreign Application Priority Data

Feb. 6, 2005 (CN) ................. 2005 1 0007246

(51) Int. Cl.
*H04B 1/38* (2006.01)
(52) U.S. Cl. ..................................... 375/222
(58) Field of Classification Search ............. 375/222, 375/232; 379/22.04; 455/507, 517, 522
See application file for complete search history.

(56) References Cited

U.S. PATENT DOCUMENTS

| 5,107,361 | A | 4/1992 | Kneidinger et al. |
| 6,061,427 | A | 5/2000 | Ryoo |
| 6,236,714 | B1 | 5/2001 | Zheng et al. |
| 2003/0022686 | A1 | 1/2003 | Soomro et al. |
| 2004/0093399 | A1 | 5/2004 | Knebel et al. |

FOREIGN PATENT DOCUMENTS

| CN | 1210399 A | 10/1999 |
| CN | 1522519 A | 8/2004 |
| CN | 100512251 C | 7/2009 |
| EP | 1429508 A2 | 6/2004 |
| JP | 2003-274053 A | 9/2003 |

(Continued)

OTHER PUBLICATIONS

Foreign communication from a related counterpart application—EP application 06705616.8, Extended European Search Report, dated Apr. 8, 2010, 6 pages.

(Continued)

*Primary Examiner*—Khai Tran
(74) *Attorney, Agent, or Firm*—Conley Rose, P.C.; Grant Rodolph

(57) ABSTRACT

A method and system for adjusting Digital Subscriber Line (DSL) transmitting power level are disclosed, and the method includes: acquiring a current noise margin according to a predetermined value of DSL transmitting power level; calculating a current power reduction value according to the current noise margin and a predetermined noise margin; determining an adjusted DSL transmitting power level for adjusting DSL transmitting power level according to the current power reduction value and the predetermined value of DSL transmitting power level. In the method of the present invention, the DSL transmitting power level may be farthest reduced; and the power consumed by the driver circuit may be farthest reduced; the resource waste and the heat introduced by consuming powers also may be reduced.

19 Claims, 3 Drawing Sheets

FOREIGN PATENT DOCUMENTS

| | | |
|---|---|---|
| WO | 20020211369 A1 | 2/2002 |
| WO | 2005055580 A1 | 6/2005 |

OTHER PUBLICATIONS

Foreign communication from a related counterpart application—PCT application PCT/CN2006/000195, English translation of International Preliminary Report on Patentability, 4 pages.

"B-PON ONT Management and Control Interface (OMCI) Support for Digital Subscriber Line Interfaces," ITU-T Recommendation G.983.10, Jun. 1, 2004.

Foreign communication from a counterpart application, Chinese application 2005100072462, office action dated Oct. 3, 2008, 4 pages.

"Asymmetric Digital Subscriber Line Transceivers (ADSL2)," Series G: Transmissions Systems and Media, Digital Systems and Networks Digital Sections and Digital Line System - Access Networks, ITU-T G.992.3, Jan. 2005.

"Asymmetric Digital Subscriber Line (ADSL) Transceivers Amendment 1: Revised Annex C, new Annex I and new Appendix V," Series G: Transmissions Systems and Media, Digital Systems and Networks Digital Sections and Digital Line System - Access Networks, ITU-T G.992.1 Amendment 1, Mar. 2003.

METHOD AND SYSTEM FOR ADJUSTING DIGITAL SUBSCRIBER LINE TRANSMITTING POWER LEVEL

CROSS REFERENCE TO RELATED APPLICATIONS

This application is a continuation of PCT application PCT/CN2006/000195 filed Feb. 5, 2006 and entitled "Method to Adjust the Transmission Power in ADSL Connection," which claims priority to Chinese application CN200510007246.2 filed Feb. 6, 2005.

FIELD OF THE INVENTION

The present invention relates to Digital Subscriber Line (DSL) technology, and more particularly, to method and system for adjusting DSL transmitting power level.

BACKGROUND OF THE INVENTION

The DSL technology uses existing copper wire, which was originally deployed for telephone service, to provide broadband service without large investment. Hence the DSL has been deployed around the world. In an Asymmetric Digital Subscriber Line (ADSL) technology, the data rate in the downlink direction from the Central Office (CO) to the Customer Premises Equipments (CPE) is much higher than that in the uplink direction from the CPE to the CO, which is suitable for residential broadband access because the data rate of ADSL technology is usually asymmetric. Therefore, the ADSL technology has the technological advantage in the residential broadband access application.

ADSL uses higher frequency than the plain old telephone service(POTS) does, the frequency band of the ADSL (here ADSL is the first generation ADSL) and ADSL2 (the second generation ADSL) is 25.875 KHz~1104 KHz, and the frequency band of ADSL2+ is 25.875 KHz~2208 KHz, while POTS uses a frequency band of 0~4 KHz. The ADSL and the POTS may be transmitted on a same telephone line simultaneously by using frequency division multiplex (FDM) technology. The ADSL and the POTS can be divided and mixed by transceivers in a Splitter at both sides, since the ADSL and the POTS occupy different frequency bands. The DSL Access Multiplexer (DSLAM) is a device which provides aggregation for multiple ADSL line and interfaces to the broadband network. Along with the development of silicon technologies, the port density of DSLAM keeps rising; one rack generally provides more than 2000 ADSL access ports. Since the ADSL makes use of the Multi-Carrier Modulation (MCM) technology, the modulated signal has a high Peak to Average Ratio (PAR) which requires the ADSL line driver circuit to use a high voltage power supply. Compared with the ADSL transmitting power level, the power consumed in the ADSL line driver circuit is much higher because of the poor efficiency of ADSL line driver circuit. FIG. 1 illustrates the correspondence relationship between the ADSL transmitting power level by using class AB power amplifier and corresponding power consumption of the ADSL line driver circuit. The horizontal axis represents the ADSL transmitting power level, and the vertical axis represents the power consumed by the ADSL line driver circuit. It can be seen that, the bigger the ADSL transmitting power level is, the bigger the power consumed by the ADSL line driver circuit is. Along with the augmentation of ADSL transmitting power level, the value for the power consumed by the ADSL line driver circuit exceeding the ADSL transmitting power level keeps rising, for example, when the ADSL transmitting power level is 20 dBm, i.e. 100 mW, the power consumed by the driver circuit attains 700~800 mW.

Since the ADSL mainly operates in the limiting rate mode and the signal-noise-ratio introduced by the power consumed by the ADSL line driver circuit usually exceeds the practical requirement greatly. The noise margin often attains more than 30 dB. In practice, most of the powers consumed by the ADSL line driver circuit are wasted, the heat introduced by consuming powers will shorten the life of device, and the crosstalk to the adjacent line pairs will impact the operation of other services, which may reduce the penetration rate (ratio of number of pair in a bundle which can carry ADSL service versus the total number of pair in a bundle) of ADSL in a bundle.

To reduce the ADSL transmitting power level, in the ADSL standard G.992.1, the International Telecommunications Union-Telecommunication Standardization Sector (ITU-T) defines the gain scaling range of the ADSL transmitting power level as −14.5~+2.5 dB, the recommended gain scaling range is −2.5 dB~+2.5 dB. The CO device adjusts the ADSL transmitting power level according to the gain scaling value proposed by the remote device. The disadvantage of the method is that the range of the power reduction is limited. In the method, the remote device and the CO device shall interoperate; if the gain scaling range supported by the remote device is small, the CO device is only able to adjust the ADSL transmitting power level within the gain scaling range supported by the remote device; secondly, chips of many vendors do not support such a gain scaling value as −14.5 dB since the recommended gain adjusting range is −2.5 dB~+2.5 dB.

SUMMARY OF THE INVENTION

The present invention provides method and system for adjusting DSL transmitting power level, so as to further reduce the DSL transmitting power level, which reduces the waste of power and improves the device life as well as DSL penetration rate.

A method for adjusting DSL transmitting power level includes the following processes:

acquiring a current noise margin according to a predetermined value of DSL transmitting power level;

calculating a current power reduction value according to the current noise margin and a predetermined noise margin;

determining an adjusted DSL transmitting power level for adjusting DSL transmitting power level according to the current power reduction value and the predetermined value of DSL transmitting power level.

A system for adjusting DSL transmitting power level includes: a first device which is configured for acquiring a current noise margin according to a predetermined value of DSL transmitting power level; a second device which is configured for calculating a current power reduction value according to the current noise margin and a predetermined noise margin; a third device which is configured for determining an adjusted DSL transmitting power level according to the current power reduction value and the predetermined value of DSL transmitting power level.

In the present invention, a current noise margin is acquired according to the predetermined value of DSL transmitting power level, and the current power reduction value is acquired according to the current noise margin and the predetermined noise margin, the adjusted DSL transmitting power level is acquired according to the current power reduction value and the predetermined value of the DSL transmitting power level, and the current value of DSL transmitting power level is adjusted to the adjusted DSL transmitting power level. In the method of the present invention, the DSL transmitting power level may be farthest reduced; and the power consumed by the driver circuit may be farthest reduced; the resource waste arid the heat introduced by consuming powers also may be reduced. Then the impact made by mass heat dispersion for the life of communication device may be avoided; the crosstalk introduced by the adjacent line pairs may be reduced; and the line utilization is improved; in addition, in the method of the present invention, the cooperation between the CO and the CPE is not necessary, and the operational state of CPE is not restricted in the method.

DETAILED DESCRIPTION OF THE INVENTION

Since ADSL mainly operates in the limiting rate mode, i.e. the line rate required by the subscriber is fixed, the maximum reduction range of ADSL transmitting power level can be determined, and the reduction range of noise margin may represent the reduction range of ADSL transmitting power level. Therefore, the embodiment of the present invention provides a method for adjusting ADSL transmitting power level, and the method includes: acquiring a current noise margin according to a predetermined value of ADSL transmitting power level; calculating a current power reduction value according to the current noise margin and a predetermined noise margin; determining an adjusted ADSL transmitting power level for adjusting ADSL transmitting power level according to the current power reduction value and the predetermined value of ADSL transmitting power level.

The embodiment of the present invention will be described based on the ADSL hereafter with reference to accompanying drawings.

Figure 1:
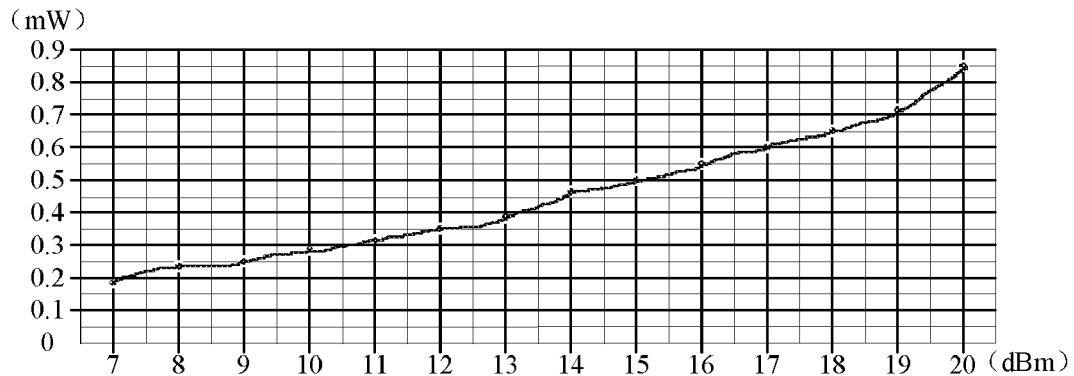
FIG. 1 is a schematic diagram illustrating the correspondence relationship between the ADSL transmitting power level and the power consumed by the driver circuit of ADSL.
Figure 2:
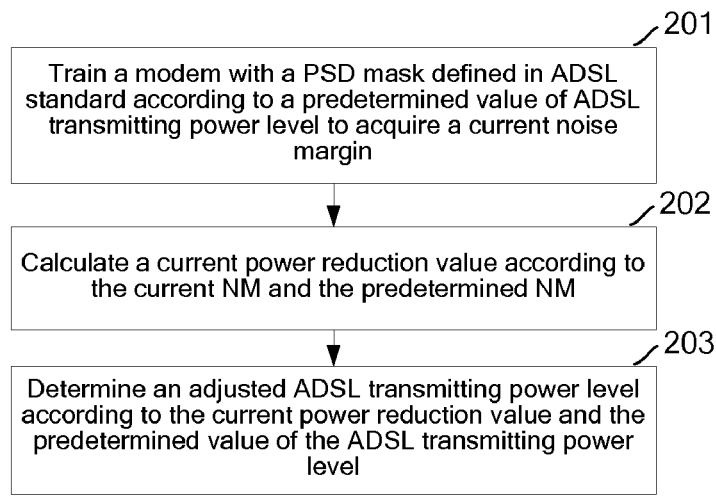
FIG. 2 is a flowchart of adjusting the ADSL transmitting power level in accordance with the one embodiment of the present invention.

FIG. 2 is a flowchart of adjusting the ADSL transmitting power level in accordance with the one embodiment of the present invention. The detailed processes are as the following.

Block 201: training a modem with a power spectrum density (PSD) mask defined in ADSL standard according to a preset line activation rate of ADSL, a predetermined noise margin and a predetermined value of ADSL transmitting power level, and acquiring a current noise margin (NM) after the training.

The predetermined noise margin may be the Target Noise Margin (TNM) defined in the ADSL standard or the maximum noise margin or minimum noise margin set by operators.

Block 202: calculate a current power reduction value according to the current practical NM and the predetermined NM.

The difference between the current practical NM and the predetermined NM may be used as the current power reduction value.

Further, since the reported NM may generally be rounded according to the ADSL standard, to avoid that the next NM trained is lower than the predetermined NM, the trained NM subtracts a constant which is more than 0.5 and less than 1 when the current power reduction value is determined, i.e. the NM trained subtracts the constant and the predetermined standard NM.

Block 203: determine an adjusted ADSL transmitting power level according to the current power reduction value and the predetermined value of the ADSL transmitting power level, and adjust a current value of ADSL transmitting power level to the adjusted ADSL transmitting power level.

Particularly, the adjusted ADSL transmitting power level may be calculated according to the following formulas.

$$EXTPSD=PSD-EXTpcb \qquad \text{Formula 1:}$$

In Formula 1, the EXTPSD represents the power spectrum density of the adjusted ADSL transmitting power level, the unit of the EXTPSD is dBm/Hz; the PSD represents the power spectrum density of the standard value of the ADSL transmitting power level, the PSD is defined by the ADSL CO; the EXTpcb represents the power spectrum density of the current power reduction value, the EXTpcb is defined by the ADSL CO, and the unit of the EXTpcb may be dB.

$$EXTpsd=EXTg\times psd. \qquad \text{Formula 2:}$$

In Formula 2, the EXTpsd represents the power spectrum density of the adjusted ADSL transmitting power level, and the EXTPSD=101 gEXTpsd; the psd represents the power spectrum density of the standard value of the ADSL transmitting power level, the psd is defined by the ADSL CO, and the unit of the psd is mw/Hz, and PSD=101 gpsd; the EXTg represents the power spectrum density of the gain scaling value, and the EXTg is defined by the ADSL CO, and EXT pcb=ABS (101 gEXTg).

It can be seen that Formula 1 is a logarithmic mode of Formula 2.

It should be noted that, in practical applications, firstly one sub-channel is selected from all ADSL sub-channels, and the processes in the above Blocks 201~202 are performed for the selected sub-channel, and the adjusted ADSL transmitting power level of the sub-channel got in the process in Block 203 is regarded as the adjusted ADSL transmitting power level of all ADSL sub-channels; alternatively, only the processes in the above Blocks 201~202 are performed for some sub-channels of ADSL, the weighted average processing is performed for the current power reduction value of each sub-channel got in the process in Block 203, the adjusted ADSL transmitting power level is calculated according to the current power reduction value got by the weighted average processing, and the adjusted ADSL transmitting power level is regarded as the adjusted transmitting power level of all ADSL sub-channels; or, the processes in the above Blocks 201~203 are performed for each sub-channel of all ADSL sub-channels respectively.

Figure 3:
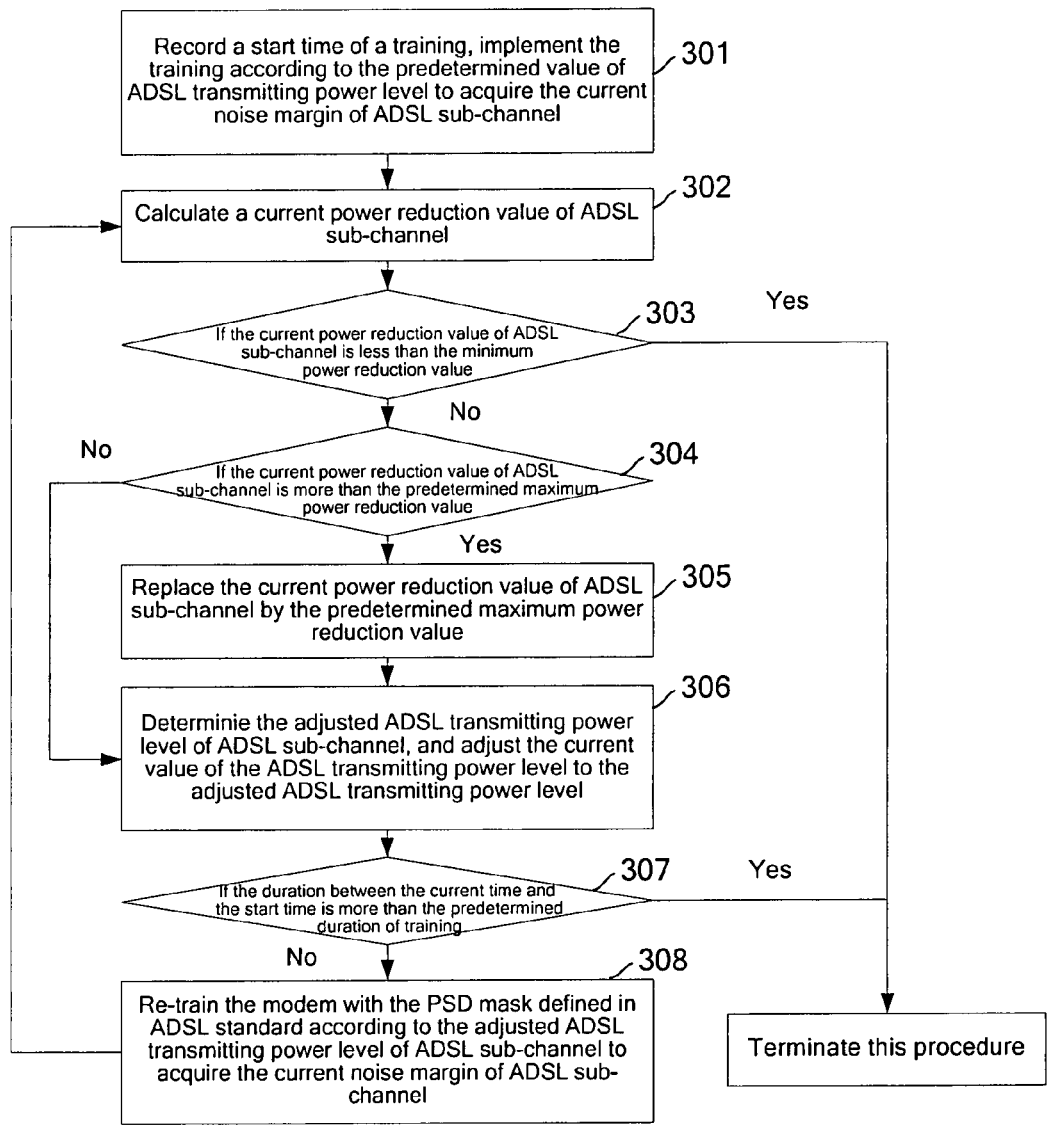
FIG. 3 is a flowchart of adjusting the ADSL transmitting power level in accordance with another embodiment of the present invention.

FIG. 3 is a flowchart of adjusting the ADSL transmitting power level in accordance with another embodiment of the present invention. In FIG. 3 the detailed processes are disclosed as follows.

Block 301: record start time of a training, and train a modem with a PSD mask defined in ADSL standard according to a preset line activation rate of ADSL, a predetermined noise margin and a predetermined value of ADSL transmitting power level, acquire a current noise margin (NM) of ADSL sub-channel, and save the current downlink attenuation value got by the training and the maximum attainable rate value of ADSL sub-channel got by the training.

Block 302: calculate a current power reduction value of ADSL sub-channel, EXTpcb, wherein EXTpcb=NM−(the predetermined standard NM)−a. and the a is a constant which is more than 0.5 and less than 1.

Block 303: determine whether the current power reduction value of ADSL sub-channel, namely EXTpcb of ADSL sub-channel, is less than the minimum power reduction value; if the EXTpcb of ADSL sub-channel is less than the minimum power reduction value; terminate this procedure; otherwise, proceed to Block 304.

The predetermined minimum power reduction value may be set based on the experience of the people skilled in the art, and the predetermined minimum power reduction value may be set as 1 dB generally.

Block 304: determine whether the EXTpcb of ADSL sub-channel is more than a predetermined maximum power reduction value; if the EXTpcb of ADSL sub-channel is more than the predetermined maximum power reduction value, proceed to Block 305; otherwise, proceed to Block 306.

When a predetermined maximum power reduction value is set, it should be considered that a too low value of the ADSL transmitting power level makes the transmitting amplifier operate in the nonlinear zone and greatly impacts the error of Digital to Analogue Converter (DAC), so generally the predetermined maximum power reduction value is set as 40 dB according to the ADSL2 standard. And the ATU at the CO (ATU-C) and the ATU at the remote side (ATU-R) are required to support the power reduction value as high as 40 dB in the ADSL2 standard.

Block 305: replace the current power reduction value of ADSL sub-channel by the predetermined maximum power reduction value, and proceed to Block 306.

Block 306: determine the adjusted ADSL transmitting power level of ADSL sub-channel according to the current power reduction value of ADSL sub-channel (EXTpcb) and the predetermined value of the ADSL transmitting power level, and adjust the current value of the ADSL transmitting power level to the adjusted ADSL transmitting power level.

Furthermore, if the current procedure for training is performed according to the adjusted ADSL transmitting power level to get the downlink attenuation value and the maximum attainable rate value, replace the downlink attenuation value and the maximum attainable rate value got in the current procedure for training with the downlink attenuation value and the maximum attainable rate value saved in the process in Block 301.

Since in the ADSL standard the protocol channel for the CO notifying the CPE of using the adjusted ADSL transmitting power level to transmit data after adjusting the ADSL transmitting power level is not defined, the CPE still calculates some parameters such as the downlink attenuation value according to the unadjusted value of the ADSL transmitting power level and the downlink maximum attainable rate value with adjusted ADSL transmitting power level during the second and subsequent training for power spectrum. Since the downlink attenuation value and the maximum attainable rate value play an important role in evaluating the quality of the line, such two parameters, the downlink attenuation value and the downlink maximum attainable rate value, need to be updated after the second and subsequent training to power spectrum are performed. The updating method is simple, i.e. replacing the downlink attenuation value and the maximum attainable rate value got in the current procedure of training with the downlink attenuation value and the maximum attainable rate value got in the first training to power spectrum according to the standard value of the ADSL transmitting power level.

Block 307: determine whether the duration between the current time and the start time of the training recorded in the process in Block 301 is more than the predetermined duration of training; if so, terminate this procedure; otherwise, proceed to Block 308.

The duration of training is defined as less than or equal to 60 seconds in Technical Report (TR) 048. Therefore, the predetermined duration of training may be set as 60 seconds.

Block 308: re-train the modem with the PSD mask defined in ADSL standard according to the preset line activation rate of ADSL, the predetermined noise margin and the adjusted ADSL transmitting power level of ADSL sub-channel, acquire the current noise margin of ADSL sub-channel, and proceed to Block 302.

The downlink attenuation value and the maximum attainable rate value may be got in the procedure of re-training.

After the re-training is performed, the ADSL transmitting power level is reduced, and the power consumed by the driver circuit is reduced along with the reduction of the ADSL transmitting power level.

Figure 4:
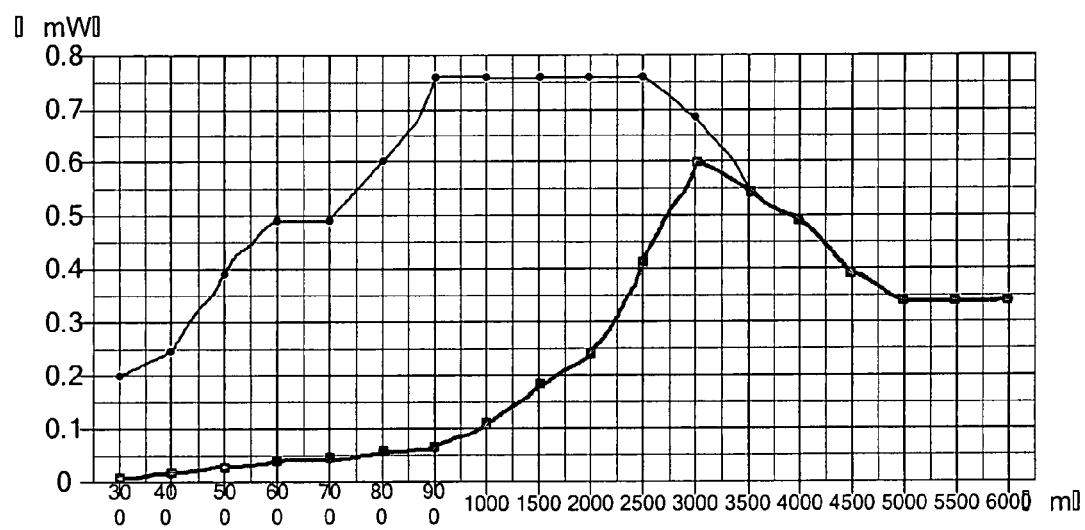
FIG. 4 is a schematic diagram comparing the correspondence relationship between the line length of ADSL and the power consumed by the ADSL driver circuit in accordance with the embodiment of the present invention with the correspondence relationship not in accordance with the embodiment of the present invention.

FIG. 4 shows a contrast between a corresponding relationship between driver circuit's power consumption of prior art and ADSL line length, and a corresponding relationship between driver circuit's power consumption of present invention and ADSL line length. In FIG. 4, the horizontal axial represents the line length of ADSL, and the vertical axial represents the power consumption of the ADSL driver circuit; the curve connected by round dots represents the correspondence relationship between power consumption and line length without using the method of the present invention; the curve connected by quadrate dots represents the correspondence relationship between power consumption and line length with using the method of the present invention. As can be seen from FIG. 4, the line driver's power consumption of present invention is dramatically reduced within a long range of 0~3000 meters by using the method of the present invention.

The foregoing is only preferred embodiments of the present invention, and is not for use in limiting the present invention. Any modification, equivalent replacement or improvement made under the principle of the present invention should be covered within the protection scope thereof.

What is claimed is:

1. A method for adjusting an Asymmetric Digital Subscriber Line (ADSL) transmitting power level, comprising:
   acquiring a current noise margin, a first current ADSL downlink attenuation, and a first maximum attainable rate after training a modem according to a present line activation rate of an ADSL, a predetermined noise margin, and a predetermined value of the ADSL transmitting power level;
   calculating a current power reduction value according to the current noise margin and the predetermined noise margin;
   determining an adjusted ADSL transmitting power level for adjusting the ADSL transmitting power level according to the current power reduction value and the predetermined value of the ADSL transmitting power level;
   after performing another training according to the adjusted ADSL transmitting power level, acquiring a second current ADSL downlink attenuation and a second maximum attainable rate; and replacing the second current ADSL downlink attenuation with the first ADSL downlink attenuation, and replacing a second maximum attainable rate with the first maximum attainable rate.

2. The method of claim 1, wherein determining the adjusted ADSL transmitting power level for adjusting the ADSL transmitting power level according to the current power reduction value and the predetermined value of the ADSL transmitting power level comprises:

determining the adjusted ADSL transmitting power level by subtracting the current power reduction value from the predetermined value of the ADSL transmitting power level.

3. The method of claim 1, wherein determining the adjusted ADSL transmitting power level for adjusting the ADSL transmitting power level according to the current power reduction value and the predetermined value of the ADSL transmitting power level comprises:

acquiring a gain scaling value according to the current power reduction value; and multiplying the gain scaling value with the predetermined value of the ADSL transmitting power level to determine the adjusted ADSL transmitting power level.

4. The method of claim 1, wherein calculating the current power reduction value according to the current noise margin and the predetermined noise margin comprises:

subtracting a constant and the predetermined noise margin from the current noise margin if the ADSL transmitting power level is adjusted, wherein the constant is in a range of 0.5 decibels (dB) to 1.0 dB.

5. The method of claim 1, further comprising:

if the current power reduction value is no less than a predetermined minimum power reduction value, proceeding to determine the adjusted ADSL transmitting power level.

6. The method of claim 5, further comprising:

if the current power reduction value is more than a predetermined maximum power reduction value, replacing the current power reduction value with the predetermined maximum power reduction value.

7. The method of claim 5, wherein the predetermined minimum power reduction value is set as 1 decibel (dB).

8. The method of claim 1, further comprising:

if the current power reduction value is more than a predetermined maximum power reduction value, replacing the current power reduction value with the predetermined maximum power reduction value.

9. The method of claim 6, wherein the predetermined maximum power reduction value is set as 40 decibels (dB).

10. The method of claim 8, wherein the predetermined maximum power reduction value is set as 40 decibels (dB).

11. The method of claim 1, further comprising:

obtaining the current noise margin according to the adjusted ADSL transmitting power level, and proceeding to calculate the current power reduction value according to the current noise margin and the predetermined noise margin.

12. The method of claim 11, further comprising:

recording a start time of acquiring a current noise margin according to the predetermined value of the ADSL transmitting power level;

determining whether a duration between the current time and the start time is more than a predetermined duration before obtaining the current noise margin;

if the duration is more than the predetermined duration, terminating this procedure; otherwise, proceeding to obtain the current noise margin.

13. The method of claim 12, wherein the predetermined duration is set as 60 seconds.

14. The method of claim 1, wherein the ADSL comprises a plurality of ADSL sub-channels;

wherein acquiring the current noise margin according to the present line activation rate of the ADSL, the predetermined noise margin, and the predetermined value of the ADSL transmitting power level comprises:

acquiring a practical noise margin of one sub-channel selected from the ADSL sub-channels used according to the present line activation rate of the ADSL, the predetermined noise margin, and the predetermined value of the ADSL transmitting power level;

wherein calculating the current power reduction value according to the current noise margin and the predetermined noise margin comprises:

calculating a power reduction value of the sub-channel selected from the ADSL sub-channels used according to the current noise margin and the predetermined noise margin; and wherein determining the adjusted ADSL transmitting power level for adjusting the ADSL transmitting power level according to the current power reduction value and the predetermined value of the ADSL transmitting power level further comprises:

determining a current ADSL transmitting power level of the ADSL sub-channels for the adjusted ADSL transmitting power level.

15. The method of claim 1, wherein the predetermined noise margin comprises:

a Target Noise Margin (TNM), a maximum noise margin or a minimum noise margin.

16. The method of claim 1, wherein acquiring the current noise margin according to the predetermined value of the ADSL transmitting power level comprises:

acquiring the current noise margin by implementing a third training with a power spectrum density mask defined in an ADSL standard.

17. A system for adjusting an Asymmetric Digital Subscriber Line (ADSL) transmitting power level, comprising:

a first device, configured for acquiring a current noise margin, a first current ADSL downlink attenuation, and a first maximum attainable rate after training a modem according to a preset line activation rate of an ADSL, a predetermined noise margin, and a predetermined value of the ADSL transmitting power level;

a second device, configured for calculating a current power reduction value according to the current noise margin and a predetermined noise margin;

a third device, configured for determining an adjusted ADSL transmitting power level according to the current power reduction value and the predetermined value of the ADSL transmitting power level;

a sixth device, configured for acquiring a second current ADSL downlink attenuation and a second maximum attainable rate after performing another training according to the adjusted ADSL transmitting power level; and a seventh device, configured for replacing the second current ADSL downlink attenuation with the first ADSL downlink attenuation, and replacing a second maximum attainable rate with the first maximum attainable rate.

18. The system of claim 17, further comprising:
a fourth device, configured for replacing the current power reduction value with a predetermined maximum power reduction value, if the current power reduction value is more than the predetermined maximum power reduction value; and making the third unit determine the adjusted ADSL transmitting power level according to the power reduction and the predetermined value of ADSL transmitting power level, if the current power reduction value is no less than a predetermined minimum power reduction value.

19. The system of claim 17, further comprising:
a fifth device, configured for obtaining the current noise margin according to the adjusted ADSL transmitting power level; and making the second unit calculate the current power reduction value according to the current noise margin and the predetermined noise margin.

\* \* \* \* \*